United States Patent
Chassoulier

(10) Patent No.: US 8,378,542 B2
(45) Date of Patent: Feb. 19, 2013

(54) MAGNETIC CENTRE-FINDING DEVICE WITH NO MAGNET ON THE ROTOR AND WITH SMALL AIR GAP

(75) Inventor: Damien Chassoulier, Mouans-Sartoux (FR)

(73) Assignee: Thales, Neuilly sur Seine (FR)

( * ) Notice: Subject to any disclaimer, the term of this patent is extended or adjusted under 35 U.S.C. 154(b) by 401 days.

(21) Appl. No.: 12/511,914

(22) Filed: Jul. 29, 2009

(65) Prior Publication Data

US 2010/0026120 A1 Feb. 4, 2010

(30) Foreign Application Priority Data

Jul. 29, 2008 (FR) ...................................... 08 04322

(51) Int. Cl.
*F16C 32/04* (2006.01)
(52) U.S. Cl. ........................................................ 310/90.5
(58) Field of Classification Search .................. 310/155; 74/5.8, 5.95
See application file for complete search history.

(56) References Cited

U.S. PATENT DOCUMENTS

| | | | | |
|---|---|---|---|---|
| 4,000,929 | A | * | 1/1977 | Studer ........................... 310/90.5 |
| 4,043,614 | A | | 8/1977 | Lyman |
| 4,268,095 | A | * | 5/1981 | Millner ......................... 310/90.5 |
| 4,294,493 | A | * | 10/1981 | Sindlinger et al. ........... 310/90.5 |
| 4,483,570 | A | * | 11/1984 | Inoue ............................ 310/90.5 |
| 4,652,780 | A | | 3/1987 | Murakami et al. |
| 4,732,353 | A | | 3/1988 | Studer |
| 4,918,345 | A | | 4/1990 | Vaillant de Guelis et al. |
| 5,250,865 | A | * | 10/1993 | Meeks .......................... 310/90.5 |
| 5,550,413 | A | | 8/1996 | Bernus et al. |
| 6,351,049 | B1 | | 2/2002 | Chassoulier et al. |
| 6,384,500 | B1 | * | 5/2002 | Chassoulier et al. ........ 310/90.5 |
| 6,700,258 | B2 | * | 3/2004 | McMullen et al. ........... 310/90.5 |
| 6,933,644 | B2 | * | 8/2005 | Kanebako .................... 310/90.5 |
| 2009/0126519 | A1 | | 5/2009 | Chassoulier |

FOREIGN PATENT DOCUMENTS

| | | | |
|---|---|---|---|
| DE | 4038382 | * | 6/1992 |
| EP | 0284487 | | 9/1988 |
| EP | 0613594 | | 9/1994 |
| EP | 0724086 | | 7/1996 |
| EP | 1942282 A1 | * | 7/2008 |
| JP | 56-150618 | * | 11/1981 |
| JP | 57-54718 | * | 4/1982 |
| JP | 62-270824 | * | 11/1987 |

* cited by examiner

*Primary Examiner* — Burton Mullins
(74) *Attorney, Agent, or Firm* — Stroock & Stroock & Lavan LLP

(57) ABSTRACT

The present invention relates to a magnetic center-finding structure, and more particularly a magnetic center-finding bearing structure intended notably for space applications. The present invention proposes a magnetic concept with no magnet on the rotor, the rotor being reduced to a crown comprising magnetic yokes, to arrange an item of equipment that can be tested on the ground, under gravity, in all positions, without the addition of extra energy, and with a reduction in the complexity of said device.

5 Claims, 3 Drawing Sheets

MAGNETIC CENTRE-FINDING DEVICE WITH NO MAGNET ON THE ROTOR AND WITH SMALL AIR GAP

CROSS-REFERENCE TO RELATED APPLICATION

The present application claims the benefit of French Application No. 08 04322, filed on Jul. 29, 2008, which is hereby incorporated by reference in its entirety.

FIELD OF THE INVENTION

The present invention relates to a magnetic centre-finding structure and, more particularly, a magnetic centre-finding bearing structure intended notably for space applications.

More specifically, the present invention proposes a magnetic centre-finding device that can be tested on the ground in all positions, without consuming extra energy and of simple design.

BACKGROUND OF THE INVENTION

Various magnetic centre-finding structures are known. They generally rely on the use of permanent magnets, windings, ferromagnetic armatures and, more often than not, an electric excitation circuit for controlling the magnetic fluxes generated by the windings. The role of a magnetic centre-finding bearing is to centre a moving body relevant to a reference body. A plurality of movements of the moving body relative to the reference body is thus prevented, or controlled. If we consider an orthogonal frame of reference consisting of three axes X-X, Y-Y, and Z-Z, centred on the centre of the device including the magnetic centre-finder, the moving body and the reference body, the axis Z-Z forming an axis of revolution of the device, and the axes X-X and Y-Y defining a median plane of the device, there are then three translations along the axes X-X, Y-Y and Z-Z and three rotations about these three same axes.

Different types of magnetic centre-finding bearings can be used to control the three translations and the three rotations, passively and/or actively.

Moreover, the moving body retains at least a degree of freedom relative to the reference body, generally a rotation about the axis Z-Z; in this case, the moving body is called rotor and the reference body stator.

Generally, tilts along the other axes are on the other hand controlled only passively. More specifically, it is in order to minimize the number of active axes, because this requires electronic controls, that it is preferable to manage the tilts passively.

Some magnetic centre-finding bearings therefore make it possible to control the three translations of the moving body relative to the reference body: along one active axis and two passive axes, along two active axes and one passive axis, or along three active axes.

Currently, for a magnetic centre-finder to be testable on the ground, under gravity, in any position, without consuming extra energy in order to sustain the rotor, the presence of magnets is necessary. It indeed makes it possible to sustain the latter under gravity without the addition of extra energy. In the absence of these magnets, it would be necessary for the magnetic bearings of the centre-finder to control five active axes, which would greatly increase the complexity of the equipment and its electronics. Furthermore, the design of a "magnetic centre-finder—rotor with magnets" subassembly is very difficult because of magnetic constraints, such as the need not to place glue on the poles of the magnets in order to minimize and master the air gaps, and mechanical constraints, such as resistance to vibration stresses and centrifugal stresses.

The current solutions that seek to propose magnetic centre-finders that can be tested in all positions under gravity, come up against the abovementioned difficulties. They include either magnets on the rotor, as in the example of FIG. 1, or magnets on the stator, but in this case, they also include an additional non-functional air gap, called static air gap. Worthy of mention are the French patents FR88400586 and FR8703489, or even EP0724 086 and U.S. Pat. No. 4,043,614. In the first case, the subassembly with the rotor is complex and constraining. It comprises a mechanical structure on which the magnets are assembled. In order to ensure the mechanical withstand strength, in particular to the vibratory stresses, such equipment generally requires protective crowns or spacers to contain the magnets subjected to the centrifugal force. Moreover, they include fixing means such as screws or glue. In the latter case, the windings exhibit a reduced efficiency because of the static air gap described previously.

Among the known technologies of the state of the art, the patent EP0284 487 can be cited. However, the device described in this patent necessarily includes, in addition to the functional air gaps participating in the generation of a magnetic flux, static, non-functional air gaps. The role of this static air gap is to prevent the whole of the magnetic flux generated by the magnets from passing into the coil, to the detriment of the rotor.

This static air gap requires the coil to be overdimensioned, since it does not participate in creating the flux between the rotor and the stator. It exists only through physical necessity. If the magnetic flux generated by the magnets does not pass to the rotor, the centre-finder would not function. However, the wider this static air gap becomes, the more bulky the coil needs to be because the magnetic flux from the coil also passes through this air gap.

Similarly, the device described in the patent EP0613 594 necessarily includes static, non-functional air gaps.

The U.S. Pat. No. 4,652,780 describes a magnetic centre-finding device in which the magnetic circuit followed by the magnetic flux generated by the windings does not pass through the same magnetic circuit as that of the magnets. This notably means:
- a greater total mass because the device includes a plurality of magnetic circuits, one "long" circuit of which bypasses the other to be looped back;
- greater iron losses because of the long magnetic circuit.

These magnet-based magnetic bearings are moreover difficult to control, partly because of a delay phenomenon induced by these iron losses.

Yet other technologies have been developed, but all have the drawback of resulting in overdimensioned magnetic centre-finding devices, that is to say devices that have a non-optimized bulk.

It is to overcome these drawbacks that the present patent application proposes a magnetic centre-finding concept with no magnet on the rotor.

SUMMARY OF THE INVENTION

To this end the subject of the invention is a magnetic centre-finding device comprising:
- a moving body, called rotor, comprising a mechanical structure and at least one magnetic yoke,
- a reference body, called stator, comprising a mechanical structure and at least one magnetic yoke, a set of windings that can be powered by a winding current and that creates a magnetic circuit of the windings, a set of magnets that creates a magnetic circuit of the magnets, at least two air gaps separating said magnetic yokes of the rotor and of the stator, wherein:

the set of windings and the set of magnets are assembled on the stator, the rotor including a steel crown comprising said mechanical structure and said magnetic yoke, the whole of said air gaps is functional, that is, they participate in the generation of forces between the rotor and the stator, the magnetic circuit of the windings and the magnetic circuit of the magnets are at least partially combined.

Preferably, the device comprises four air gaps.

In one embodiment of the invention, said air gap has a dimension less than approximately two millimetres.

In a preferred implementation of the invention, each air gap has a dimension less than approximately one millimetre.

Advantageously, the magnetic yoke of the rotor has two sets of teeth, making it possible to improve the efficiency of the magnetic centre-finder.

In an exemplary application of the invention, a gyroscopic actuator can comprise a universal joint and a wheel, said wheel comprising a magnetic centre-finding device for the rotor relative to the stator according to the invention.

BRIEF DESCRIPTION OF THE DRAWINGS

Other features and benefits of the invention will become apparent from the following description, given in light of the appended drawings which represent.

DETAILED DESCRIPTION OF THE INVENTION

Figure 1:
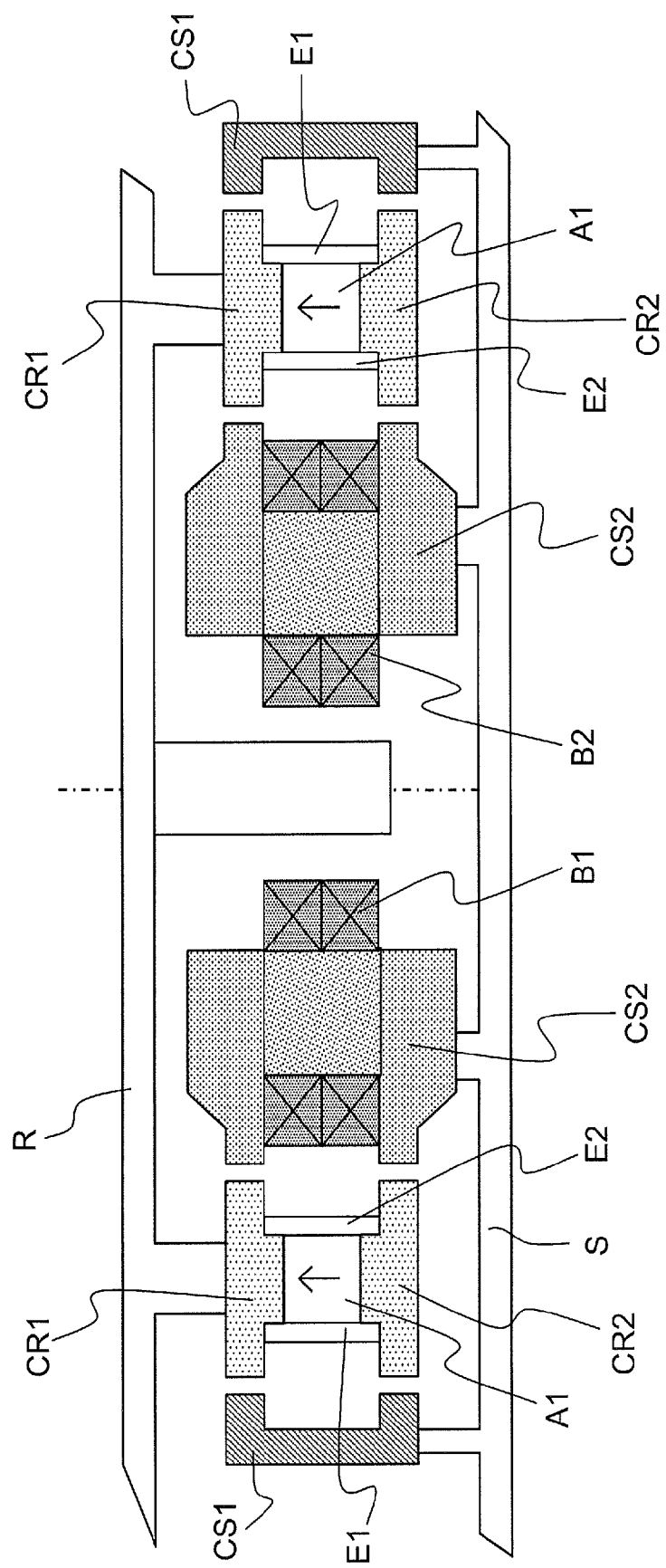
FIG. 1: the diagram of a magnetic centre-finder according to the state of the art, through a cross-sectional plane orthogonal to said centre-finder.

FIG. 1 shows a diagram of an exemplary magnetic centre-finder that can be tested in all positions under gravity, without consuming extra energy, according to the state of the art. The stator S comprises two circular magnetic yokes CS1 and CS2 and windings B1 and B2. The crown of magnets A1 on the rotor R makes it possible to sustain the rotor passively, without the addition of extra energy to offset gravity. It is the combination of the windings B1, B2, assembled on the magnetic yokes CS1 and CS2 of the stator S and of the magnets A1 assembled on the magnetic yokes CR1 and CR2 of the rotor R which constitutes the "magnetic centre-finding bearing" assembly. In the absence of the magnets A1 on the rotor R, the magnetic bearings would have to control five axes actively, which would result in a major increase in the complexity of the equipment.

The presence of the magnets A1 on the rotor R necessitates the use of protections or spacers E1, E2 which contain the magnets A1 subjected to the centrifugal force which is applied to the rotor R. This is essential to ensure the strength to withstand the mechanical stresses, vibratory in particular. In practice, the magnetic bearing needs to be able to withstand two types of stresses: the vibratory stresses due to the launch into space, and the centrifugal stresses in operation. This makes the design of such devices complex. Thus, to these spacers E1, E2 are added necessary fixing means not represented in FIG. 1, such as screws or glue for example. Generally, the robustness, and in particular the strength to withstand the vibratory tests, is very difficult to ensure and makes developing the subassembly with the rotor R complex. This type of solution, which can be used to produce magnetic centre-finders that can be tested under gravity in all positions without the addition of extra energy results in stresses and an increase in the complexity of the magnetic centre-finder.

Figure 2:
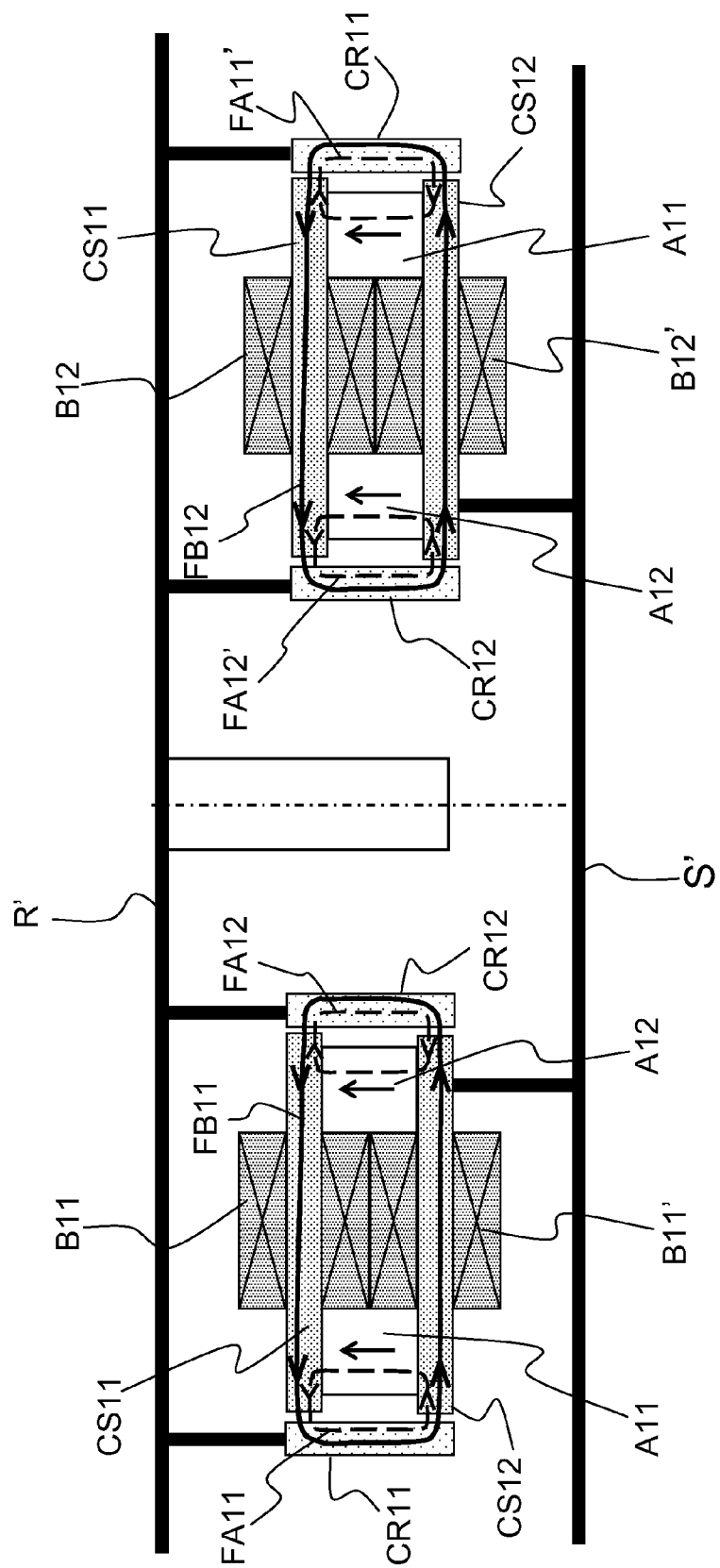
FIG. 2: the diagram of a magnetic centre-finder according to the invention, through a cross-sectional plane orthogonal to said centre-finder.

FIG. 2 represents a cross-sectional view, along a plane orthogonal to its circular base, of a magnetic centre-finder according to the invention. It should be noted that a cross section along a plane orthogonal to the cross-sectional plane used would give the same result. The rotor R' is in this case reduced to a crown of steel comprising magnetic yokes CR11 and CR12. It has no magnet. It is the stator S' which supports both the set of windings B11, B11', B12, B12' and the crowns of magnets A11, A12. The positioning of the magnets A11, A12 on the stator S' provides a de facto way of eliminating the mechanical stresses linked to the centrifugal effect for said magnets A11, A12. The magnetic fluxes, FB11 and FB12 created by the windings B11, B11', B12, B12', and FA11, FA12, FA11', FA12' created by the magnets A11, A12, pass through the air gaps separating the magnetic yokes CR11 and CR12 of the rotor R from the magnetic yokes CS11 and CS12 of the stator S. They enable the device to provide the magnetic centre-finder function. A winding current can be applied to the windings B11, B11', B12, B12', making it possible to control the relative centring of the rotor R and of the stator S. This winding current generates a force that unbalances the magnetic fields FA11, FA12, FA11', FA12' in the air gaps.

In the "rotor centred" position, the magnetic fluxes FA11, FA12, FA11', FA12' generated by the magnets in the air gaps make it possible to sustain the rotor R passively along the rotation axis of the rotor R and actively about the equilibrium point according to the other two axes, the control being possible thanks to the mastery of the magnetic fluxes FB11, FB12.

It should be noted that, in the inventive device, the air gap is small, that is to say less than 2 millimetres, or even less than 1 millimetre. Above all, the set of windings B11, B11', B12, B12' is functional. All participate in the creation of the magnetic fluxes FB11, FB12. Because of this, the windings B11, B11', B12, B12' can have reduced dimensions and the overall bulk of the device is limited.

Furthermore, this architecture makes it possible to reduce the overall bulk for another reason: as FIG. 2 shows, the magnetic fluxes FB11, FB11', FB12, FB12' created by the windings B11, B11', B12, B12' locally follow the same magnetic circuits as those used by the magnetic fluxes FA11, FA11', FA12, FA12' generated by the magnets A11, A12. The formation of two distinct magnetic circuits, one bypassing the other, is thus avoided, which makes it possible to significantly reduce the bulk compared to the devices of the state of the art.

Moreover, although FIG. 2 represents magnetic yokes CR11 and CR12 on the rotor R that do not have sets of teeth, this is not limiting. In practice, these yokes CR11, CR12 can typically have two sets of teeth, which improves the efficiency of the magnetic centre-finder by making it easier to obtain a magnetic flux orthogonal to said sets of teeth.

Figure 3:
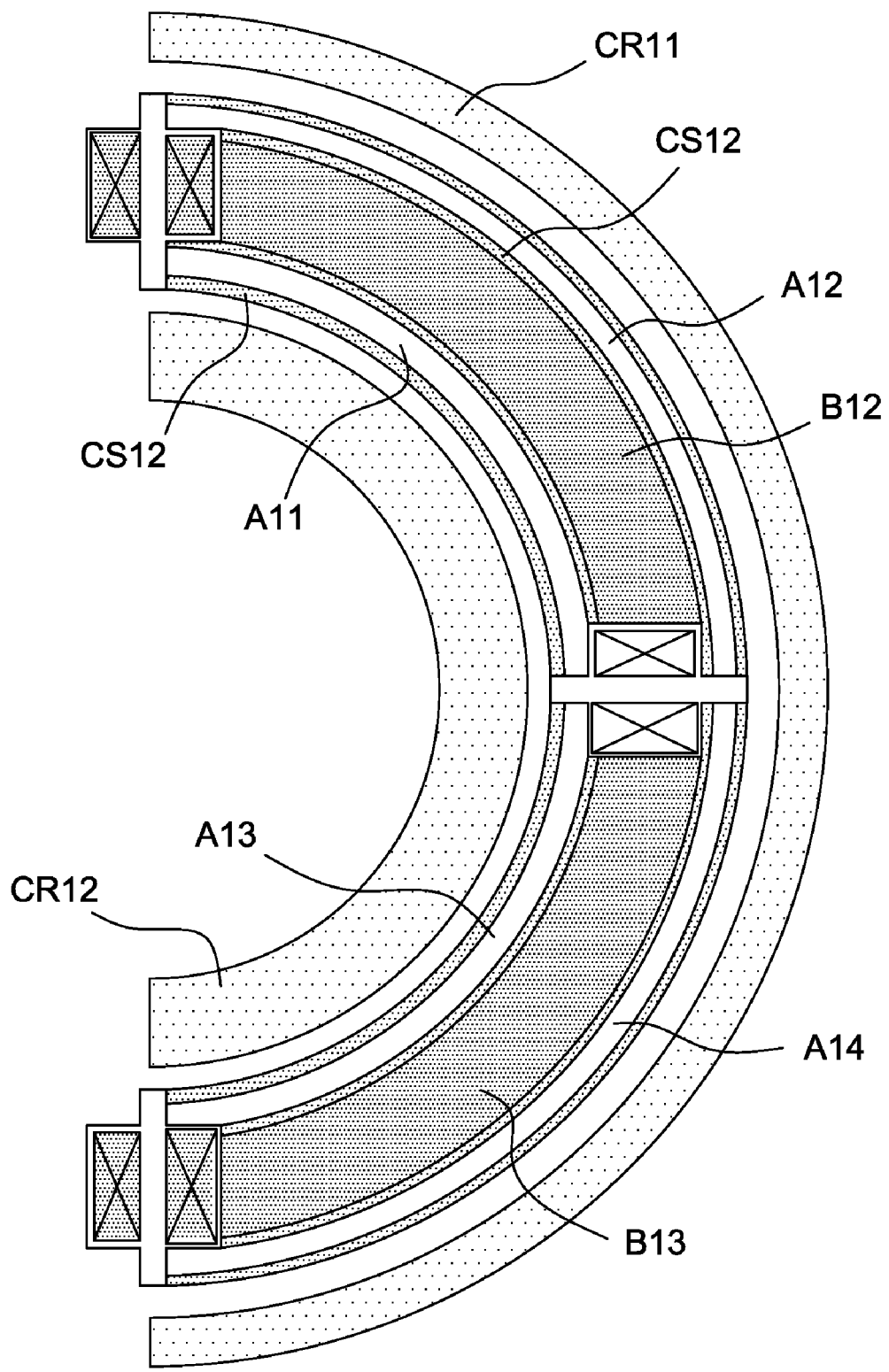
FIG. 3: the diagram of a magnetic centre-finder according to the invention, through a cross-sectional plane parallel to said centre-finder.

FIG. 3 provides another point of view on the magnetic centre-finder according to the invention with a half plan-view along a cross-sectional plane parallel to the circular base of the centre-finder situated just under the upper part of the magnetic yoke CS11. The magnetic yokes CR11, CR12 of the rotor R can be clearly seen, with, in the middle, the windings and the magnets assembled between the magnetic yokes CS11 and CS12 of the stator S.

To sum up, the main benefit of the invention is that it proposes a magnetic centre-finder concept with no magnet on the rotor, the rotor being reduced to a crown comprising magnetic yokes, making it possible to position an equipment that can be tested on the ground, under gravity, in all positions, without the addition of extra energy, and without increasing the complexity of said device. Cost, bulk and design simplicity are optimized.

The invention claimed is:

1. A magnetic center-finding device comprising:
   a magnet-free rotor movable around a rotation axis, comprising a first mechanical support structure, a first rotor-mounted magnetic yoke secured to the first mechanical support structure at a first distance from the rotation axis, and a second rotor-mounted magnetic yoke secured to the first mechanical support structure at a second distance from the rotation axis, wherein the first distance is different from the second distance;
   a stator, comprising a second mechanical support structure, an upper stator-mounted magnetic yoke secured to the second mechanical support structure and a lower stator-mounted magnetic yoke secured to the second mechanical support structure, the upper stator-mounted magnetic yoke and the lower stator-mounted magnetic yoke positioned between the first rotor-mounted magnetic yoke and the second rotor-mounted magnetic yoke, wherein at least two air gaps are formed and positioned at a location adjacent to each of the first distance and the second distance that separate the first and second rotor-mounted magnetic yokes from the upper and lower stator-mounted magnetic yokes;
   a plurality of windings disposed adjacent to the upper and lower stator-mounted magnetic yokes, each of the windings having a winding current, to provide power; and
   a plurality of magnets disposed adjacent to the plurality of windings;
   wherein:
   said plurality of windings comprises a first set of windings powered by a winding current and wound around said lower stator-mounted magnetic yoke and a second set of windings powered by a winding current and wound around said upper stator-mounted magnetic yoke;
   said plurality of magnets generates a magnetic flux following a magnetic path which passes through both said upper and said lower stator-mounted magnetic yokes and through said airgaps; and
   said first set of windings and said second set of windings generate a magnetic flux that follows a magnetic path that also passes through both of said upper and said lower stator-mounted magnetic yokes and through said airgaps.

2. The device according to claim 1, wherein each air gap has a dimension less than two millimeters.

3. The device according to claim 1, wherein each air gap has a dimension less than one millimeter.

4. The device according to claim 1, wherein the first and second rotor-mounted magnetic yokes each have two sets of teeth, to improve the efficiency of said magnetic center-finding device.

5. A gyroscopic actuator comprising:
   a universal joint; and
   a wheel;
   wherein said wheel comprises a magnetic center-finding device for a rotor relative to a stator according to claim 1.

* * * * *